(12) United States Patent
Sano et al.

(10) Patent No.: US 7,691,533 B2
(45) Date of Patent: Apr. 6, 2010

(54) ELECTRODE WITH CONDUCTIVE POLYMER-COVERED CARBON NANOTUBES AND ELECTROCHEMICAL ELEMENT EMPLOYING THE SAME

(75) Inventors: Atsushi Sano, Tokyo (JP); Satoshi Maruyama, Tokyo (JP)

(73) Assignee: TDK Corporation, Tokyo (JP)

( * ) Notice: Subject to any disclaimer, the term of this patent is extended or adjusted under 35 U.S.C. 154(b) by 1143 days.

(21) Appl. No.: 10/896,866

(22) Filed: Jul. 23, 2004

(65) Prior Publication Data
US 2005/0042450 A1 Feb. 24, 2005

(30) Foreign Application Priority Data
Jul. 28, 2003 (JP) ............ P2003-281292

(51) Int. Cl.
*H01M 4/60* (2006.01)
*H01M 4/02* (2006.01)

(52) U.S. Cl. ............... 429/213; 429/209
(58) Field of Classification Search ............. 429/231.8, 429/213
See application file for complete search history.

(56) References Cited

U.S. PATENT DOCUMENTS

| 6,031,711 A | 2/2000 | Tennent et al. |
| 6,509,116 B1 | 1/2003 | Kaneko et al. |
| 2003/0068550 A1* | 4/2003 | Naoi et al. ............ 429/213 |
| 2003/0077515 A1* | 4/2003 | Chen et al. ............ 429/231.8 |
| 2003/0148187 A1* | 8/2003 | Yamaguchi et al. ......... 429/245 |

FOREIGN PATENT DOCUMENTS

| JP | A 7-130356 | 5/1995 |
| JP | A 11-329413 | 11/1999 |
| JP | A 2000-124079 | 4/2000 |
| JP | A 2001-35494 | 2/2001 |
| JP | A 2001-155975 | 6/2001 |
| JP | A 2002-25868 | 1/2002 |
| JP | 2002187233 A * | 7/2002 |
| JP | A 2002-203742 | 7/2002 |
| JP | A 2003-045415 | 2/2003 |
| JP | A 2003-109875 | 4/2003 |
| JP | A 2003-282062 | 10/2003 |

OTHER PUBLICATIONS

K. Jurewicz et al.; "Supercapacitors from Nanotubes/Polypyrrole Composites;" Chemical Physics Letters; Oct. 19, 2001; vol. 347; Nos. 1,2,3, pp. 36-40.
Mark Hughes et al.; "Electrochemical Capacitance of a Nanoporous Composite of Carbon Nanotubes and Polypyrrole;" Chem. Mater.; Apr. 2002; vol. 14; No. 4; pp. 1610-1613.

* cited by examiner

*Primary Examiner*—Dah-Wei D Yuan
*Assistant Examiner*—Zachary Best
(74) *Attorney, Agent, or Firm*—Oliff & Berridge, PLC

(57) ABSTRACT

The invention provides an electrode 1 comprising a collector 1*a* with electron conductivity and an electrode active material-containing layer 1*b* with electron conductivity formed on the collector 1*a*, wherein the electrode active material-containing layer 1*b* includes conductive polymer-covered carbon nanotubes.

20 Claims, 12 Drawing Sheets

ELECTRODE WITH CONDUCTIVE POLYMER-COVERED CARBON NANOTUBES AND ELECTROCHEMICAL ELEMENT EMPLOYING THE SAME

BACKGROUND OF THE INVENTION

1. Field of the Invention

The present invention relates to an electrode, and to an electrochemical element employing it.

2. Related Background of the Invention

Electrochemical elements such as electrochemical capacitors (for example, electrical double layer capacitors), secondary batteries (for example, lithium ion secondary batteries, lithium metal secondary batteries and nickel-hydrogen batteries) are currently being developed as energy regenerable power sources for hybrid automobiles and fuel cell automobiles. Such electrochemical elements must meet increasing requirements for improved characteristics including energy density and discharge capacity.

In order to achieve such improved characteristics, it has been proposed to include conductive polymers in electrodes, as described in Japanese Patent Application Laid-Open No. 2001-155975 (Patent Document 1) and Japanese Patent Application Laid-Open No. 2001-35494 (Patent Document 2), for example. It has also been proposed to include carbon nanotubes in electrodes, as described in Japanese Patent Application Laid-Open No. 2000-124079 (Patent Document 3). Including composites of activated carbon and conductive polymers in electrodes has also been proposed, as described in Japanese Patent Application Laid-Open No. 2002-25868 (Patent Document 4).

SUMMARY OF THE INVENTION

However, the electrochemical capacitors or secondary batteries provided with electrodes comprising conductive polymers described in Patent Documents 1 and 2 have low electrode surface areas and therefore low discharge capacities and inadequate energy densities. The electrical double layer capacitor provided with electrodes comprising carbon nanotubes described in Patent Document 3 also has a low discharge capacity and inadequate energy density. The electrical double layer capacitor provided with electrodes comprising a composite of activated carbon and a conductive polymer described in Patent Document 4, as well, has a low discharge capacity and inadequate energy density. The electrochemical elements of Patent Documents 1 to 4 also exhibit insufficient high-current discharge characteristics.

The present invention was accomplished in light of these circumstances of the prior art, and its object is to provide an electrode which allows construction of an electrochemical element with high energy density and excellent high-current discharge characteristics, as well as an electrochemical element employing the electrode.

As a result of much diligent research directed toward achieving the aforestated object, the present inventors have discovered that using carbon nanotubes (hereinafter also referred to as "CNT(s)") to fabricate electrodes can result in the problem of aggregation of the CNTs during preparation of coating solutions for formation of electrode active material-containing layers, and that addition of a large amount of binder is effective for inhibiting CNT aggregation. Although this strategy introduced the problem of increased internal resistance of the electrode, the present inventors found, upon further research, that the aforementioned object can be achieved by forming the carbon nanotubes into a specific construction, and the invention was completed on this basis.

In other words, the electrode of the invention is an electrode comprising a collector with electron conductivity and an electrode active material-containing layer with electron conductivity formed on the collector, wherein the electrode active material-containing layer includes conductive polymer-covered carbon nanotubes. Carbon nanotubes are a material composed entirely of carbon atoms in a graphite layer rounded into a cylindrical shape, and they have diameters of no greater than 100 nm. The diameters are preferably no greater than 50 nm and more preferably no greater than 15 nm. The carbon nanotubes of the invention may also be vapor phase growth carbon fibers so long as the aforementioned conditions are satisfied.

The electrode of the invention allows construction of an electrochemical element with high energy density and excellent high-current discharge characteristics. The present inventors set forth the following explanation as the reason why an electrochemical element with high energy density and excellent high-current discharge characteristics is obtained using the electrode of the invention. First, in a conventional electrode comprising a composite of activated carbon and a conductive polymer, the surface of the activated carbon is covered by the conductive polymer, and therefore the surface area is reduced and the spaces in the pores of the activated carbon do not function effectively. It is thought that this causes reduced discharge capacity and lower energy density. However, it is believed that in the case of the electrode of the invention which has CNTs covered with a conductive polymer, the electric capacity obtained by oxidation-reduction of the conductive polymer is combined with the electrical double layer capacity exhibited on the inner walls of the CNTs. Consequently, the electric capacity is improved, the energy density is increased and high-current discharge is also possible, even if a large amount of binder is included during fabrication of the electrode.

The electrode of the invention is an electrode for an electrochemical element, and it may be used as either the anode or cathode. The conductive polymer-covered carbon nanotubes in the electrode of the invention function as an electrode active material, depending on the mode of use. Other materials may also be included as electrode active materials.

According to the invention, an "electrode active material" is one of the following materials, depending on the mode of use of the electrode. Specifically, if the electrode is used as the anode of a primary battery, the "electrode active material" will be a reducing agent, and if it is used as the cathode of a primary battery, the "electrode active material" will be an oxidizing agent. If the electrode is used as the anode of a secondary battery (during discharge), the "electrode active material" is a material which is a reducing agent, is chemically stable whether in its reduced form or oxidized form, and can reversibly undergo reduction reaction from its oxidized form to its reduced form and oxidation reaction from its reduced form to its oxidized form. If the electrode is used as the cathode of a secondary battery (during discharge), the "electrode active material" is a material which is an oxidizing agent, is chemically stable whether in its reduced form or oxidized form, and can reversibly undergo reduction reaction from its oxidized form to its reduced form and oxidation reaction from its reduced form to its oxidized form.

In addition to the above, when the electrode is used in a primary battery and secondary battery, the "electrode active material" may be a material capable of storage or release (intercalation or doping/dedoping) of metal ions participating in the electrode reaction. As examples of such materials there may be mentioned carbon materials used in anodes and/or cathodes of lithium ion secondary batteries, or metal oxides or the like. Metal oxides include compound metal oxides.

The conductive polymer in the electrode of the invention preferably has at least a molecular structure comprising a repeating unit based on a monomer represented by formula (1) below. If the conductive polymer has a molecular structure comprising such a repeating unit, the oxidation-reduction potential of the conductive polymer will be 3.6 V (vs. Li/Li+) or greater, and the discharge capacity and energy density will be improved.

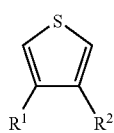

(1)

[wherein $R^1$ and $R^2$ each independently represent at least one selected from the group consisting of hydrogen, alkyl, aryl and alkoxy. $R^1$ and $R^2$ may also bond together at any of their carbon atoms to form a divalent group with a cyclic structure.]

The monomer represented by formula (1) above is preferably at least one selected from the group consisting of 3-methylthiophene, 3-butylthiophene, 3-phenylthiophene, 3-methoxythiophene and ethylenedioxythiophene.

The conductive polymer in the electrode of the invention preferably has at least a molecular structure comprising a repeating unit based on a monomer represented by formula (2) below.

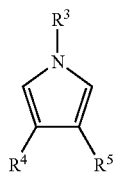

(2)

[wherein $R^3$ represents hydrogen or alkyl, and $R^4$ and $R^5$ each independently represent at least one selected from the group consisting of hydrogen, alkyl, aryl and alkoxy. $R^4$ and $R^5$ may also bond together at any of their carbon atoms to form a divalent group with a cyclic structure.]

The conductive polymer in the electrode of the invention preferably has at least a molecular structure comprising a repeating unit based on at least one selected from the group consisting of aniline, indole, pyridine and diaminoanthraquinone.

The electrode active material-containing layer in the electrode of the invention may also contain activated carbon. This will facilitate manufacture of the electrode and further improve the energy density of the electrode.

The conductive polymer in the electrode of the invention is formed on the carbon nanotubes by electrolytic polymerization. Electrolytic polymerization will facilitate covering of the carbon nanotubes with the conductive polymer.

The electrolytic polymerization is carried out using as a working electrode a carbon nanotube-containing electrode comprising a collector with electron conductivity and an electrode active material-containing layer formed on the collector, the electrode active material-containing layer containing carbon nanotubes and exhibiting electron conductivity, with the working electrode immersed in a solution containing the monomer of the conductive polymer (hereinafter referred to as "monomer solution"). Electrolytic polymerization carried out in this manner can form a film of the conductive polymer on the carbon nanotubes inside the electrode.

The electrolytic polymerization is carried out using an electrolytic cell employing the working electrode (carbon nanotube-containing electrode) and the monomer solution. The "electrolytic cell" in this case is not particularly restricted so long as it employs the working electrode, and for example, it may be a two-electrode electrolytic cell composed of a working electrode and a counter electrode also serving as the reference electrode, or it may be a three-electrode electrolytic cell composed of working electrode, a reference electrode and a counter electrode. Regardless of the type of electrolytic cell, if the working electrode is held at a constant potential for a prescribed period of time, the surface of the working electrode may serve as a reaction field in which oxidation reaction proceeds selectively, while the counter electrode may serve as a reaction field in which reduction reaction proceeds selectively. However, it is preferred to use a three-electrode type electrolytic cell from the standpoint of more precisely controlling the potential of the working electrode with respect to the reference electrode, and thereby conducting the desired oxidation reaction in a more selective and reliable manner.

The electrolytic polymerization may also be carried out using a solution containing a monomer as the structural material of the conductive polymer and carbon nanotubes (hereinafter referred to as "monomer/CNT mixed solution"). This form of electrolytic polymerization is carried out using an electrolytic cell as described above, but in this case the working electrode may be the aforementioned carbon nanotube-containing electrode, or a commonly employed electrode such as a platinum electrode or carbon electrode. Also, the monomer/CNT mixed solution is used instead of the monomer solution. When the electrolytic polymerization is carried out using a commonly employed electrode, the composite of the conductive polymer and carbon nanotubes formed on the electrode will be used as the conductive polymer-covered carbon nanotubes in the electrode of the invention, for fabrication of the electrode.

The invention further provides an electrochemical element comprising mutually opposing first and second electrodes, a separator situated between the first and second electrodes, an electrolyte solution, and a case housing the first electrode, second electrode, separator and electrolyte solution in a sealed state, wherein at least one of the first and second electrodes is an electrode comprising a collector with electron conductivity and an electrode active material-containing layer with electron conductivity formed on the collector, wherein the electrode active material-containing layer includes conductive polymer-covered carbon nanotubes (the electrode of the invention as described above). The electrochemical element of the invention comprises an electrode according to the invention and therefore exhibits excellent high-current discharge characteristics and improved energy density.

Both the first and second electrode in the electrochemical element of the invention may have the feature of being electrodes according to the invention. In this case, the electrochemical element will function as an electrochemical capacitor.

According to the invention, an "electrochemical element" is an element provided with at least mutually opposing first and second electrodes, a separator situated between the first and second electrodes and an electrolyte solution. According to the invention, the electrochemical element may also have a module construction wherein a plurality of unit cells are arranged in serial or parallel in a single case.

More specifically, an "electrochemical element" is preferably a secondary battery or an electrochemical capacitor. As secondary batteries there may be mentioned nonaqueous electrolytic secondary batteries employing nonaqueous electrolyte solutions, such as lithium ion secondary batteries, and secondary batteries employing aqueous electrolyte solutions. As electrochemical capacitors there may be mentioned electrical double layer capacitors, pseudo-capacitance capacitors, redox capacitors and the like.

DETAILED DESCRIPTION OF THE PREFERRED EMBODIMENTS

Figure 1:
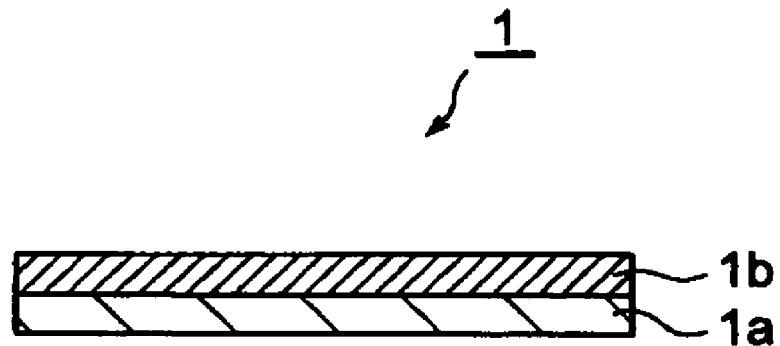
FIG. 1 is a schematic cross-sectional view of an embodiment of the basic construction of the electrode of the invention.

Preferred embodiments of the electrode of the invention and of electrochemical elements employing it will now be explained with reference to the accompanying drawings. Throughout the following explanation, identical or corresponding components will be indicated by like reference numerals, and will be explained only once.

(Electrode)

FIG. 1 is a schematic cross-sectional view of the electrode of the invention. As shown in FIG. 1, the electrode 1 of the invention comprises a collector 1a with electron conductivity, and an electrode active material-containing layer 1b with electron conductivity formed on the collector 1a. The electrode active material-containing layer 1b includes conductive polymer-covered carbon nanotubes, as a structural material. An electrochemical element provided with this electrode 1 will therefore exhibit high energy density and excellent high-current discharge characteristics.

The collector 1a is not particularly restricted so long as it is a good conductor which allows adequate charge mobility to the electrode active material-containing layer 1b, and the collector 1a may be one which is used for publicly known electrodes. A metal foil such as aluminum may be mentioned as an example for the collector 1a. Metal foils which have been etched or rolled may be used without any particular restriction.

The thickness of the collector 1a is preferably 15-50 µm and more preferably 15-30 µm from the standpoint of achieving smaller size and lighter weight of the electrode 1.

There are no particular restrictions on the other structural conditions of the electrode active material-containing layer 1b, so long as it is constructed to include conductive polymer-covered carbon nanotubes in the structural material. From the standpoint of more reliably obtaining the effect of the invention, the content of conductive polymer-covered carbon nanotubes covered in the electrode active material-containing layer 1b is preferably 3-90 wt % and more preferably 10-80 wt % based on the total weight of the electrode active material-containing layer 1b. If the content of conductive polymer-covered carbon nanotubes is below the aforementioned lower limit, the improvement in electric capacity will tend to be inadequate, while if it is above the aforementioned upper limit, preparation of the coating solution for fabrication of the electrode will tend to be difficult.

"Conductive polymer-covered carbon nanotubes" refers to carbon nanotubes which are totally or partially covered with a conductive polymer. Also, the carbon nanotubes have a diameter of no greater than 100 nm (preferably no greater than 50 nm and more preferably 1-15 nm). Carbon nanotubes with a diameter of greater than 100 nm tend to exhibit inadequate electrical double layer capacity. There is no particular restriction on their lengths, but they are preferably no greater than 500 µm. For this embodiment, "carbon nanotubes" also includes vapor phase growth carbon fibers.

The carbon nanotubes may be multi wall carbon nanotubes (MWCNT) or single wall carbon nanotubes (SWCNT). There are no particular restrictions on their configuration, and it may be an armchair, zigzag or chiral configuration, or a combination of these structures.

The conductive polymer preferably has at least a molecular structure comprising a repeating unit based on a monomer represented by formula (1) below.

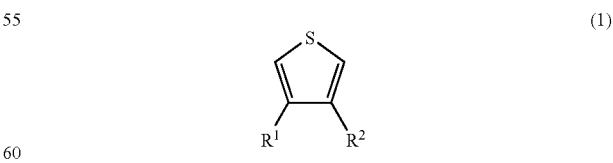

(1)

In formula (1), $R^1$ and $R^2$ each independently represent at least one selected from the group consisting of hydrogen, alkyl (preferably C1-5 alkyl), aryl (preferably C6-12 aryl) and alkoxy (preferably C1-5 alkoxy). $R^1$ and $R^2$ may also bond together at any of their carbon atoms to form a divalent group with a cyclic structure. Preferred groups among the substituents mentioned above for $R^1$ and $R^2$ to form a divalent group are alkyl and/or alkoxy groups, with carbon atoms of the substituents bonded together. An example of such a divalent group is ethylenedioxy (—$OCH_2CH_2O$—).

The monomer represented by formula (1) above is preferably at least one selected from the group consisting of 3-methylthiophene, 3-butylthiophene, 3-phenylthiophene, 3-methoxythiophene and ethylenedioxythiophene.

The conductive polymer may also have at least a molecular structure comprising a repeating unit based on a monomer represented by formula (2) below.

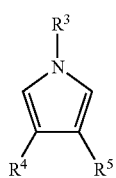

(2)

In formula (2), $R^3$ represents hydrogen or alkyl (preferably C1-5 alkyl), and $R^4$ and $R^5$ each independently represent at least one selected from the group consisting of hydrogen, alkyl (preferably C1-5 alkyl), aryl (preferably C6-12 aryl) and alkoxy (preferably C1-5 alkoxy). $R^4$ and $R^5$ may also bond together at any of their carbon atoms to form a divalent group with a cyclic structure. Preferred groups among the substituents mentioned above for $R^4$ and $R^5$ to form a divalent group are alkyl and/or alkoxy groups, with carbon atoms of the substituents bonded together. An example of such a divalent group is ethylenedioxy (—$OCH_2CH_2O$—).

The monomer represented by formula (2) is preferably at least one selected from the group consisting of 3-methylpyrrole, 3-butylpyrrole, 3-phenylpyrrole, 3-methoxypyrrole and ethylenedioxypyrrole.

The conductive polymer may also have at least a molecular structure comprising a repeating unit based on at least one selected from the group consisting of aniline, indole, pyridine and diaminoanthraquinone.

The conductive polymer-covered carbon nanotubes are formed by electrolytic polymerization. The electrolytic polymerization is carried out using a solution containing the aforementioned monomer as the structural material of the conductive polymer, and the carbon nanotubes (monomer/CNT mixed solution).

specifically, the electrolytic polymerization is carried out using an electrolytic cell containing the monomer/CNT mixed solution and using a commonly employed electrode such as a platinum electrode or carbon electrode as the working electrode, with a constant potential held for a prescribed period of time. The potential at this time will be about 4.0-5.0 V (Li/Li+ standard). The method of electrolytic polymerization is not particularly restricted, and may be appropriately selected from among constant-potential electrolysis, constant-current electrolysis, potential-sweep, current-pulse, potential-pulse and the like. In this case, the electrolytic cell may be either a two-electrode or three-electrode system. The monomer/CNT mixed solution contains the components necessary for electrolytic polymerization, such as an organic solvent (propylene carbonate, etc.) capable of dispersing or dissolving the monomer and carbon nanotubes, as well as an electrolyte ($LiBF_4$, etc.) and the like.

The electrolytic polymerization causes the conductive polymer-covered carbon nanotubes, which are a composite of the conductive polymer and the carbon nanotubes, to be deposited on the surface of the working electrode.

The electrode active material-containing layer 1b is in a sheet-like form. Its thickness is preferably no greater than 200 μm and more preferably 10-100 μm. If the thickness of the electrode active material-containing layer 1b is greater than 200 μm, it will be difficult to downsize the electrode, while cracks may be produced during the electrode fabrication, thereby hampering fabrication of the electrode. On the other hand if the thickness is less than 10 μm, a sufficient volume energy density will be less likely.

The electrode active material-containing layer 1b may also contain electrode active materials other than the conductive polymer-covered carbon nanotubes, as well as carbon materials (more preferably, activated carbon) and the like. The electrode active material-containing layer 1b may further contain structural materials other than carbon materials, such as binders or the like. There are no particular restrictions on the types and contents of structural materials other than conductive polymer-covered carbon nanotubes in the electrode active material-containing layer 1b, and for example, there may be added auxiliary conductive agents (carbon blacks, etc.) which can confer conductivity to carbon powder, and binders (polytetrafluoroethylene (PTFE), fluororubber binders, etc.).

The electrode active material-containing layer 1b is formed on the collector 1a (or on the undercoat layer when an undercoat layer is present), in the following manner. First, a coating solution for formation of the electrode active material-containing layer is prepared, which comprises at least the conductive polymer-covered carbon nanotubes, a binder and a liquid capable of dissolving the binder. The solution is then coated onto the collector 1a and the liquid is removed to form the electrode active material-containing layer 1b. The electrode active material-containing layer 1b preferably also contains an auxiliary conductive agent to obtain superior electron conductivity.

simple carbon nanotubes, i.e. carbon nanotubes which are not covered with a conductive polymer, may also be used instead of the conductive polymer-covered carbon nanotubes during preparation of the coating solution for formation of the electrode active material-containing layer.

In this case, the obtained carbon nanotube-containing electrode (comprising the collector 1a with electron conductivity and the electrode active material-containing layer 1b formed on the collector 1a, the electrode active material-containing layer 1b containing carbon nanotube and exhibiting electron conductivity) will not contain conductive polymer-covered carbon nanotubes. The carbon nanotubes in the carbon nanotube-containing electrode may then be covered with a conductive polymer by the following method.

specifically, the carbon nanotube-containing electrode is used as the working electrode, with the working electrode being immersed in a monomer solution containing the aforementioned monomer and electrolyte polymerization carried out by the same method as described above. This will allow a conductive polymer film to be formed not only over the carbon nanotubes inside the electrode, but over the entire electrode. For immersion of the carbon nanotube-containing electrode, the just the surface of the electrode active material-containing layer 1b may be immersed, or its entirety may be immersed. The monomer solution comprises the aforementioned monomer as well as components necessary for the electrolytic polymerization, such as an organic solvent (propylene carbonate, etc.) capable of dispersing or dissolving the monomer and an electrolyte ($LiBF_4$, etc.). The above-mentioned monomer/CNT mixed solution may also be used as the monomer solution.

Aggregation of the CNTs will hamper formation of a coating solution when preparing the coating solution for formation of the electrode active material-containing layer. Thus, as mentioned above, the present inventors added a large amount of binder to the coating solution for formation of the electrode active material-containing layer, in order to facilitate preparation of the coating solution.

The content of the binder in the electrode active material-containing layer 1b is preferably 10-80 wt % and more preferably 20-70 wt %. If the binder content is less than the lower limit, the carbon nanotubes will tend to aggregate during preparation of the coating solution, and if it is greater than the upper limit, the internal resistance will be increased and the electrode characteristics will tend to be insufficient.

The electrode 1 of the invention may also be provided with an undercoat layer (not shown). The undercoat layer will be a layer situated between the collector 1a and the electrode active material-containing layer 1b. The undercoat layer performs the function of enhancing the physical and electrical cohesion of each of the layers (collector 1a and electrode active material-containing layer 1b) in the electrode 1. It comprises, as structural materials, at least conductive particles and a binder capable of binding the conductive particles. The undercoat layer is formed in the following manner. First, an undercoat layer-forming coating solution containing the conductive particles, a binder and a liquid capable of dissolving the binder is prepared and coated onto the surface of the collector 1a, and then the liquid is removed to complete formation of the layer.

(Electrochemical Element)

Figure 2:
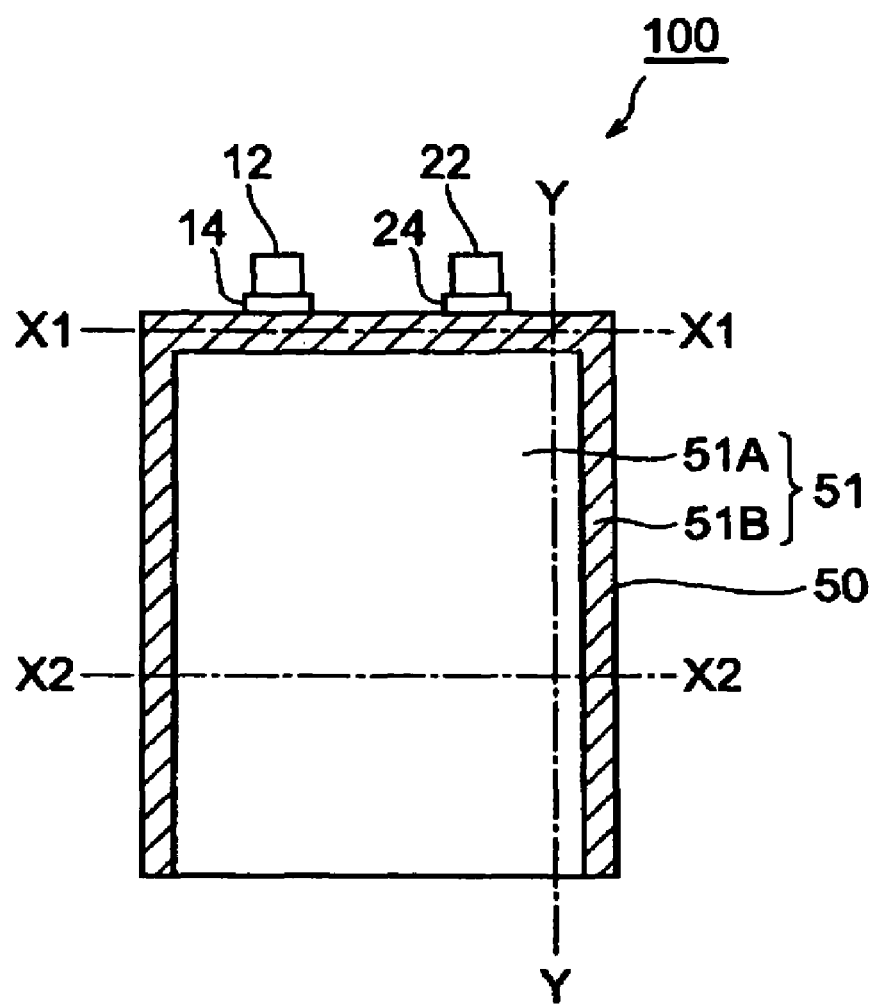
FIG. 2 is a plan view of a preferred embodiment of the electrochemical element of the invention.
Figure 3:
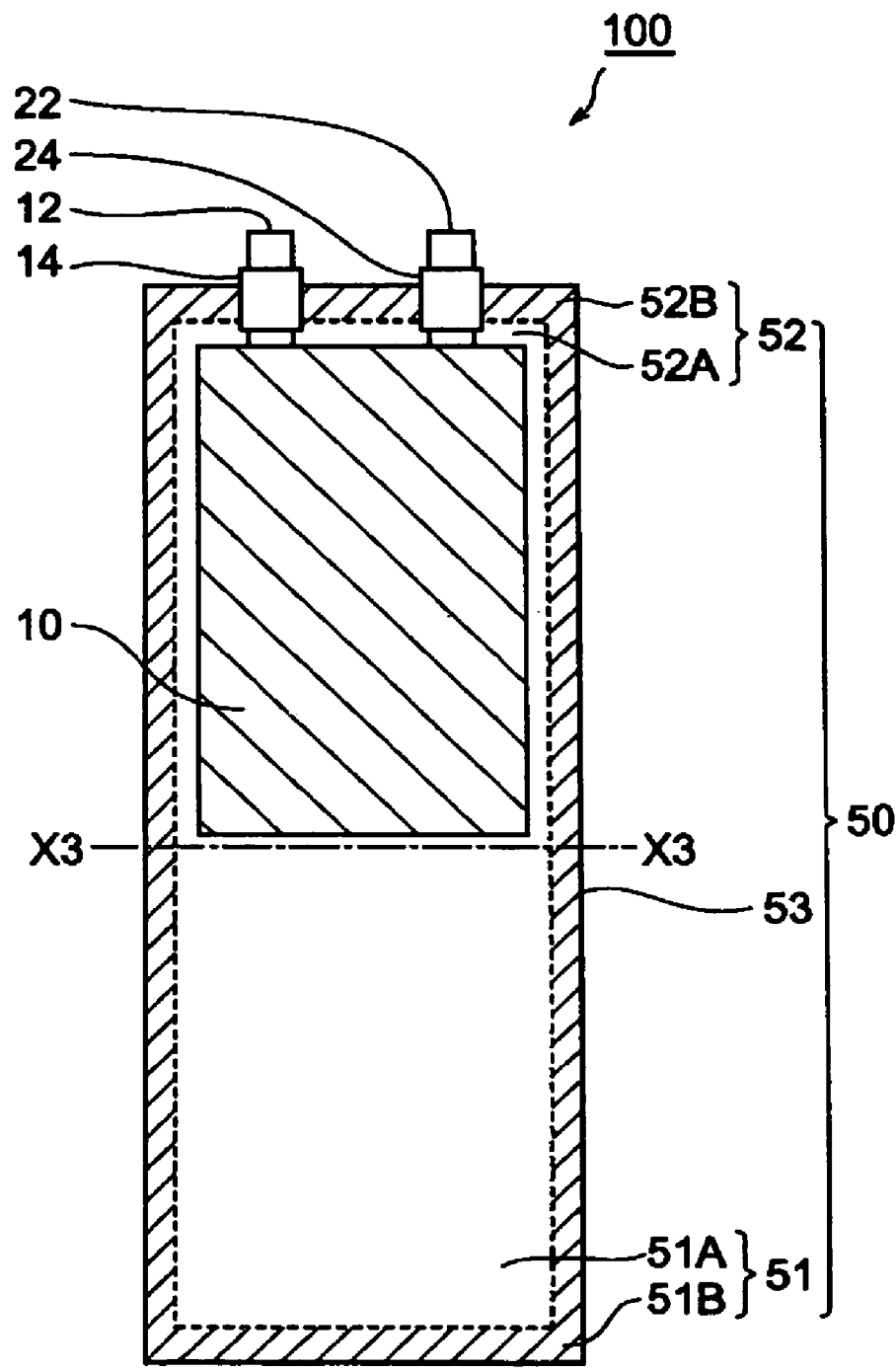
FIG. 3 is a developed view of the interior of the electrochemical element shown in FIG. 2, as seen from the direction normal to the surface of the anode 10.
Figure 4:
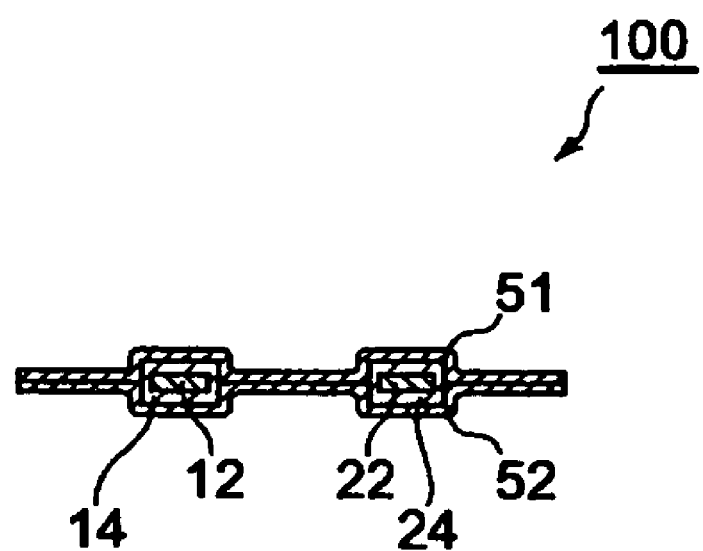
FIG. 4 is a schematic cross-sectional view of the electrochemical element shown in FIG. 2, cut along line X1-X1 of FIG. 2.
Figure 5:
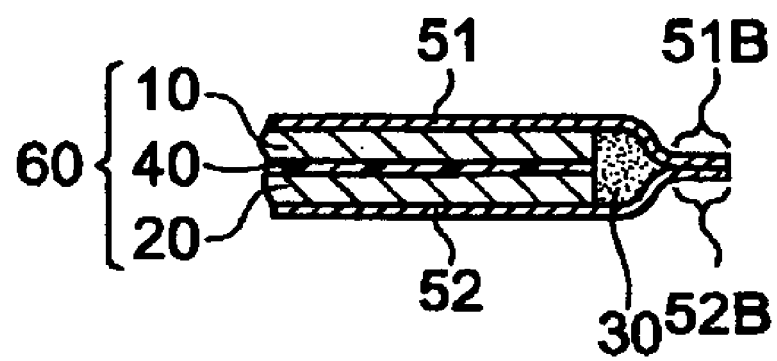
FIG. 5 is a schematic cross-sectional view of the essential parts of the electrochemical element shown in FIG. 2, cut along line X2-X2 of FIG. 2.
Figure 6:
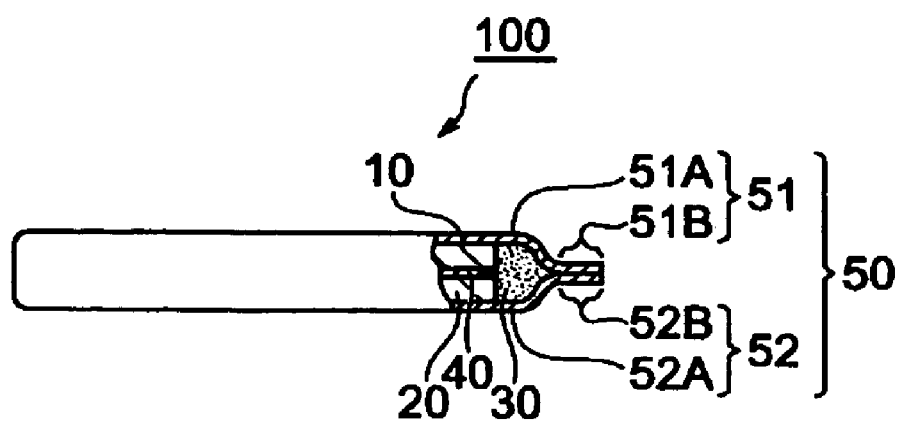
FIG. 6 is a schematic cross-sectional view of the essential parts of the electrochemical element shown in FIG. 2, cut along line Y-Y of FIG. 2.

FIG. 2 is a plan view of a preferred embodiment of the electrochemical element of the invention. FIG. 3 is a developed view of the interior of the electrochemical element shown in FIG. 2, as seen from the direction normal to the surface of the anode 10. FIG. 4 is a schematic cross-sectional view of the electrochemical element shown in FIG. 2, cut along line X1-X1 of FIG. 2. FIG. 5 is a schematic cross-sectional view of the essential parts of the electrochemical element shown in FIG. 2, cut along line X2-X2 of FIG. 2. FIG. 6 is a schematic cross-sectional view of the. essential parts of the electrochemical element shown in FIG. 2, cut along line Y-Y of FIG. 2.

As shown in FIGS. 2 to 6, the electrochemical element 100 is composed essentially of a sheet-like first electrode (hereinafter, "anode") 10 and a sheet-like second electrode (hereinafter, "cathode") 20 which are mutually opposing, a sheet-like separator 40 situated between and adjacent to the anode 10 and cathode 20, an electrolyte solution 30, a case 50 housing the components in a sealed state, an anode lead 12, one end of which is electrically connected to the anode 10 and the other end of which protrudes out of the case 50, and a cathode lead 22, one end of which is electrically connected to the cathode 20 and the other end of which protrudes out of the case 50. For convenience, the "anode" 10 and "cathode" 20 are determined by the polarity of the electrochemical element 100 during discharge. During charge, therefore, the "anode 10" becomes the "cathode", and the "cathode 20" becomes the "anode". An electrode of the invention is used as the cathode 20 for this embodiment.

The electrochemical element 100 has the construction described below in order to achieve the aforementioned object of the invention.

The constituent elements of this embodiment will now be explained in detail with reference to FIGS. 2 to 9.

The case 50 is formed using a pair of opposing films (a first film 51 and a second film 52). The first film 51 and second film 52 are connected in this embodiment, as shown in FIG. 3. That is, the case 50 of this embodiment is formed by folding a rectangular film composed of a single composite package film on the folding line X3-X3 shown in FIG. 3, and adhesive-bonding or heat-sealing the pair of edges on opposite ends of the rectangular film (edge 51B of the first film 51 and edge 52B of the second film 52 in the drawing).

The first film 51 and second film 52 represent the sections of the film having opposing surfaces, created when the single rectangular film 53 is folded in the manner described above. Throughout the present specification, the edges 51B, 52B of the first film 51 and second film 52 after bonding will be referred to as "seal sections".

Since this will eliminate the need for a seal section to bond the first film 51 and second film 52 at the section of the folding line X3-X3, the seal sections of the case 50 can thereby be reduced. As a result, the volume energy density, which is based on the space volume provided in the electrochemical element 100, can be further improved.

For this embodiment, as shown in FIGS. 2 and 3, one of the ends of both the anode lead 12 and cathode lead 22 connected to the anode 10 protrude out from the seal section bonding the edge 51B of the first film 51 and the edge 52B of the second film.

The film forming the first film 51 and second film 52 is a flexible film. Since a thin, lightweight film can be easily formed, it is possible for the thin electrochemical element itself to be thinly produced. The original volume energy density can thus be easily improved, while also improving the volume energy density based on the space volume provided in the electrochemical element.

The film is not particularly restricted so long as it is a flexible film. From the standpoint of ensuring sufficient mechanical strength and light weightness of the case 50 while also effectively preventing infiltration of moisture or air from the exterior of the case 50 into the interior of the case 50 or escape of the electrolyte components from the interior of the case 50 to the exterior of the case 50, the film is preferably a "composite package film" having at least an innermost layer made of a synthetic resin in contact with the electrolyte solution 30, and a metal layer situated over the innermost layer.

Figure 7:
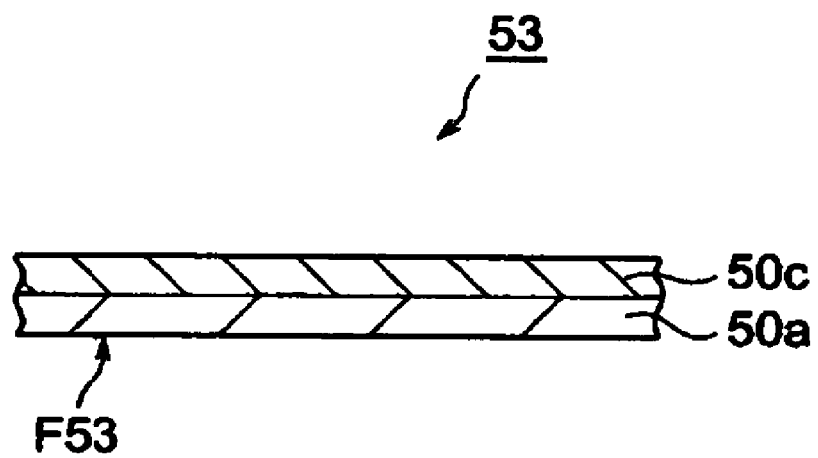
FIG. 7 is a schematic cross-sectional view showing an example of the basic construction of a film serving as the structural material of the case for the electrochemical element shown in FIG. 2.
Figure 8:
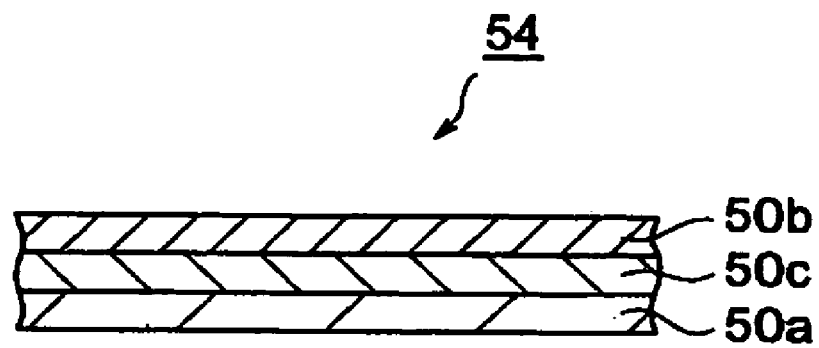
FIG. 8 is a schematic cross-sectional view showing another example of the basic construction of a film serving as the structural material of the case for the electrochemical element shown in FIG. 2.

As examples of composite package films to be used as the first film 51 and second film 52 there may be mentioned composite package films having the constructions shown in FIG. 7 and FIG. 8. The composite package film 53 shown in FIG. 7 comprises an innermost layer 50a made of a synthetic resin in contact with the electrolyte solution 30 on the interior side, and a metal layer 50c situated on the other side (the outer side) of the innermost layer 50a. The composite package film 54 shown in FIG. 8 has a construction wherein an outermost layer 50b made of a synthetic resin is also situated on the outer side of the metal layer 50c of the composite package film 53 shown in FIG. 7.

The composite package film used as the first film 51 and second film 52 is not particularly restricted so long as it is a composite package material having two or more layers, specifically one or more synthetic resin layers including the aforementioned innermost layer, and a metal layer such as a metal foil. From the standpoint of more reliably achieving the same effect as described above, the composite package film preferably is composed of three or more layers, consisting of an innermost layer 50a, an outermost layer 50b made of a synthetic resin which is situated on the outer surface of the case 50 farthest from the innermost layer 50a, and at least one metal layer 50c situated between the innermost layer 50a and the outermost layer 50b, as in the composite package film 54 shown in FIG. 8.

The innermost layer 50a is a layer with flexibility. The flexibility may be provided by the structural material of the innermost layer 50a, and there are no particular restrictions so long as it is a synthetic resin having chemical stability against the electrolyte solution 30 used (resistance to chemical reaction, dissolution and swelling) and chemical stability against oxygen and water (air moisture). The structural material of the innermost layer 50a is also preferably a material with the property of low permeability with respect to oxygen, water (air moisture) and the components of the electrolyte solution 30. As examples of structural materials for the innermost layer 50a there may be mentioned engineering plastics, as well as thermoplastic resins such as polyethylene, polypropylene, modified polyethylene acid, modified polypropylene acid, polyethylene ionomer, polypropylene ionomer and the like.

An "engineering plastic" is a plastic with excellent dynamic characteristics, heat resistance and durability for use in mechanical parts, electrical parts, construction materials and the like. As examples of engineering plastics there may be mentioned polyacetals, polyamides, polycarbonates, polyoxytetramethyleneoxyterephthaloyl (polybutylene terephthalate), polyethylene terephthalate, polyimides, polyphenylene sulfide and the like.

When a synthetic resin layer such as an outermost layer 50b is also provided in addition to the innermost layer 50a, as in the composite package film 54 shown in FIG. 8, the synthetic resin layer may also employ the same structural material as the innermost layer.

The metal layer 50c is preferably a layer formed from a metal material which is resistant to corrosion by oxygen, water (air moisture) and the electrolyte solution 30. For example, a metal foil made of aluminum, aluminum alloy, titanium, chromium or the like may be used.

The sealing method for all of the seal sections of the case 50 is not particularly restricted, but a heat sealing method is preferred from the standpoint of productivity.

Figure 9:
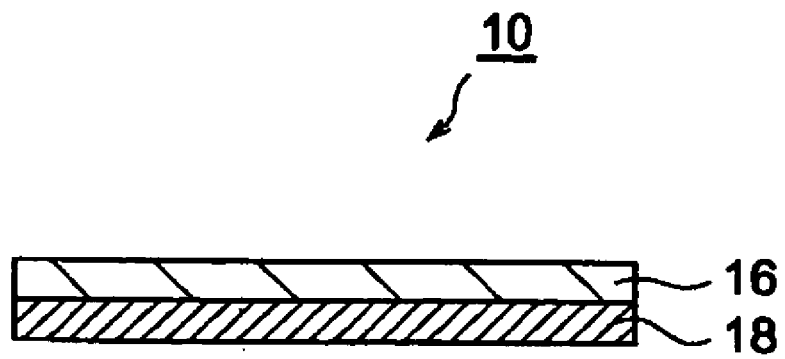
FIG. 9 is a schematic cross-sectional view showing an example of the basic construction of the anode of the electrochemical element shown in FIG. 2.

The anode 10 and cathode 20 will now be explained. FIG. 9 is a schematic cross-sectional view showing an example of the basic construction of the anode of the electrochemical element 100 shown in FIG. 2. The electrode 1 of the invention is used for the cathode 20.

As shown in FIG. 9, the anode 10 comprises a collector 16 and an anode active material-containing layer 18 formed on the collector 16. As mentioned above, the cathode 20 comprises a collector 1a and a cathode active material-containing layer 1b formed on the collector 1a, as shown in FIG. 1.

The collector 16 is not particularly restricted so long as it is a good conductor which allows adequate charge mobility to the anode active material-containing layer 18, and the collector may be one which is used for publicly known electrochemical elements. For example, the collector 16 may be a metal foil such as aluminum, copper or the like.

The anode active material-containing layer 18 of the anode 10 is composed mainly of an anode active material, an auxiliary conductive agent and a binder.

The anode active material is not particularly restricted so long as it is a material capable of reversible storage and release of a cation (for example, lithium ion or another alkali metal ion, quaternary ammonium ion, imidazolium ion), desorption and intercalation of a cation, or doping and dedoping with a cation and its counter anion (for example, $BF_4^-$, $PF_6^-$, $ClO_4^-$, $CF_3SO_3^-$, $(CF_3SO_2)_2N^-$, $(CF_3CF_2SO_2)_2N^-$, $(CF_3SO_2)(CF_3C_3F_6SO_2)N^-$), and publicly known anode active materials may be used. As examples of such active materials there may be mentioned carbon materials such as natural graphite, artificial graphite, graphitizing carbon, non-graphitizing carbon, and low-temperature baked carbon, metals that can form compounds with lithium, such as Al, Si and Sn, amorphous compounds composed mostly of oxides such as $SiO_2$ and $SnO_2$, and lithium titanate ($Li_4Ti_5O_{12}$).

The anode active material used may be activated carbon, a p-type doped conductive polymer, an n-type doped conductive polymer or conductive polymer-covered carbon nanotubes according to the present invention. In terms of constructing a high-voltage, high-energy density electrochemical element, it is preferred to use an n-type toped conductive polymer. Using a p-type doped conductive polymer for both the anode and cathode will result in a rocking chair type wherein only a single ion moves between the electrodes, making it possible to construct an electrochemical element wherein the ion concentration of the electrolyte solution is not limited by the volume.

The electrochemical element according to this embodiment functions as a secondary battery when the active material is carbon which promotes intercalation and desorption of lithium ions, a metal which can form a compound with lithium, an amorphous compound composed mainly of oxides or lithium titanate. When the anode or cathode is activated carbon, it will function as an electrochemical capacitor.

The aforementioned carbon material has an interlayer distance $d_{002}$ of 0.335-0.338 nm, and preferably the crystal size $Lc_{002}$ of the carbon material is between 30-120 nm. As carbon materials which satisfy these conditions there may be mentioned artificial graphite and MCF (mesocarbon fibers). The interlayer distance $d_{002}$ and the crystal size $Lc_{002}$ may be determined by X-ray diffraction.

There are no particular restrictions on the auxiliary conductive agent, and any publicly known auxiliary conductive agent may be used. As examples there may be mentioned carbon blacks, carbon materials, metal powders of copper, nickel, stainless steel or iron, mixtures of carbon materials and metal powders, or conductive oxides such as ITO.

The binder is not particularly restricted so long as it can bind the particles of the anode active material and the particles of the auxiliary conductive agent. As examples there may be mentioned fluororesins such as polyvinylidene fluoride (PVDF), polytetrafluoroethylene (PTFE), tetrafluoroethylene-hexafluoropropylene copolymer (FEP), tetrafluoroethylene-perfluoroalkylvinyl ether copolymer (PFA), ethylene-tetrafluoroethylene copolymer (ETFE), vinylidene fluoride-hexafluoropropylene-tetrafluoroethylene copolymer, polychlorotrifluoroethylene (PCTFE), ethylene-chlorotrifluoroethylene copolymer (ECTFE) and polyvinyl fluoride (PVF). The binder not only binds the particles of the anode active material and the particles of the auxiliary conductive agent, but also contributes to binding with the foil (collector 16).

The anode active material-containing layer 18 preferably also comprises an electron conductive porous body. As examples of electron conductive porous bodies there may be mentioned carbon materials (for example, activated carbon) obtained by activation treatment of metallurgical coal (for example, petroleum coke produced by a delayed coker using bottom oil from petroleum heavy oil in a fluidized catalytic cracker, or residual oil of a vacuum distillation apparatus). When the electrochemical element 100 is used as a metal lithium secondary battery, the anode 10 may also be a metal foil made of lithium.

The cathode active material-containing layer 1b of the cathode 20, is composed mainly of a cathode active material, an auxiliary conductive agent and a binder, similar to the anode active material-containing layer 18.

The cathode active material contains the above-mentioned conductive polymer-covered carbon nanotubes. Since carbon nanotubes increase the conductivity of the electrode and augment the electrical double layer capacity, it contributes to improved volume energy density. The conductive polymer has Faraday pseudo-capacitance which increases the capacity of the electrode, and therefore improves the volume energy density.

Other cathode active materials (for example, carbon materials such as activated carbon, low-temperature baked carbon, artificial graphite or natural graphite, or conductive polymers, or disulfides) are not particularly restricted so long as they are materials capable of reversible storage and release of a cation (for example, lithium ion or another alkali metal ion, quaternary ammonium ion, imidazolium ion), desorption and intercalation of a cation, or doping and dedoping with a cation and its counter anion (for example, $BF_4^-$, $PF_6^-$, $ClO_4^-$, $CF_3SO_3^-$, $(CF_3SO_2)_2N^-$, $(CF_3CF_2SO_2)_2N^-$, $(CF_3SO_2)(CF_3C_3F_6SO_2)N^-$), and publicly known cathode active materials may be used. For example, there may be mentioned complex metal oxides such as lithium cobaltate ($LiCoO_2$), lithium nickelate ($LiNiO_2$), lithium manganese spinel ($LiMn_2O_4$), compound metal oxides represented by the general formula: $LiNi_xCo_yMn_zO_2$ (x+y+z=1), lithium vanadium compounds ($LiV_2O_5$), olivine $LiMPO_4$ (where M represents Co, Ni, Mn or Fe) and lithium titanate ($Li_4Ti_5O_{12}$). When the electrochemical element functions as an electrochemical capacitor, the cathode active material may include a metal (or metal alloy), a metal oxide or a carbon material (including carbon nanotubes).

The constituent elements other than the cathode active material in the cathode active material-containing layer 1b may be the same materials as used in the anode active material-containing layer 18. The binder used in the cathode active material-containing layer 1b not only binds the particles of the cathode active material and the particles of the auxiliary conductive agent, but also contributes to binding with the foil (collector 1a). The cathode active material-containing layer 1b also preferably comprises an electron conductive porous body.

The collector 1a of the cathode 20 is electrically connected to one end of a cathode lead 22 made of, for example, aluminum or tantalum, while the other end of the cathode lead 22 extends to the exterior of the case 50. The collector 18 of the anode 10 is also electrically connected to one end of an anode lead 12 made of, for example, copper, aluminum or nickel, while the other end of the anode lead 12 extends to the exterior of the case 50.

The separator 40 situated between the anode 10 and cathode 20 is not particularly restricted so long as it is formed of an insulating porous body, and any separator employed in publicly known electrochemical elements may be used. As examples of insulating porous bodies there may be mentioned laminates of films made of polyethylene, polypropylene or polyolefins, stretched films comprising mixtures of these resins, or nonwoven fabrics comprising fibers made of at least one structural material selected from the group consisting of cellulose, polyester and polypropylene.

The electrode solution 30 is filled into the inner space of the case 50, and a portion thereof becomes included inside the anode 10, cathode 20 and separator 40. The type of electrolyte solution 30 is appropriately selected based on the type of electrochemical element. For example, when the electrochemical element is a lithium ion secondary battery, a nonaqueous electrolyte solution is used as the electrolyte solution 30. The nonaqueous electrolyte solution 30 used is obtained by dissolving a lithium salt in a nonaqueous solvent (organic solvent). As lithium salts there may be used salts such as, for example, $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$ and $LiN(CF_3CF_2CO)_2$. These salts may be used either alone or in combinations of two or more. The nonaqueous electrolyte solution 30 may also be used in a gel form produced by addition of a gelling agent such as a gel polymer.

The nonaqueous electrolyte solution 30 contains a nonaqueous solvent (organic solvent) such as propylene carbonate, ethylene carbonate or diethyl carbonate. The nonaqueous electrolyte solution 30 may also contain additives such as sultone compounds, cyclic sulfuric acid esters or vinylene carbonate.

As shown in FIGS. 2 and 3, the section of the anode lead 12 contacting with the seal section of the enclosure formed by the edge 51B of the first film 51 and the edge 52B of the second film 52 is covered by an insulator 14 to prevent contact between the anode lead 12 and the metal layer in the composite package film of each film. Likewise, the section of the anode lead 22 contacting with the seal section of the enclosure formed by the edge 51B of the first film 51 and the edge 52B of the second film 52 is covered by an insulator 24 to prevent contact between the anode lead 22 and the metal layer in the composite package film of each film.

There are no particular restrictions on the construction of the insulator 14 and the insulator 24, and for example, they may be formed of synthetic resins. A construction lacking the insulator 14 and insulator 24 may be used if it is possible to adequately prevent the anode lead 12 and cathode lead 22 from contacting the corresponding metal layers in the composite package film.

A process for fabrication of the case 50 and electrochemical element 100 described above will now be explained.

The process for production of an element 60 (laminate comprising the anode 10, separator 40 and cathode 20 laminated in that order) is not particularly restricted, and any publicly known process employed for fabrication of publicly known electrochemical elements may be used. The electrode of the invention described above may be used as the cathode 20.

For fabrication of the anode 10, first the aforementioned constituent components are mixed and dispersed in a solvent capable of dissolving the binder, to form a coating solution (slurry, etc.) for formation of the anode active material-containing layer. The solvent is not particularly restricted so long as it can dissolve the binder and can disperse the auxiliary conductive agent, and for example, N-methyl-2-pyrrolidone or N,N-dimethylformamide may be used.

Next, the coating solution for formation of the anode active material-containing layer is coated onto the surface of a collector and then dried and rolled to form an anode active material-containing layer on the collector, thereby completing fabrication of the anode 10. The method used for coating of the coating solution for formation of the anode active material-containing layer on the collector is not particularly restricted, and may be appropriately chosen as suitable for the collector material, shape, etc. As examples of suitable methods there may be mentioned metal mask printing, electrostatic coating, dip coating, spray coating, roll coating, doctor blade coating, gravure coating, screen-printing and the like.

The anode lead 12 and cathode lead 22 are each electrically connected to the fabricated anode 10 and cathode 20 (electrode 1 of the invention), respectively. The separator 40 is situated between and in (non-adhesive) contact with the anode 10 and cathode 20 to complete the element 60.

An example of a fabrication process for the case 50 will now be explained. First, if the first film and second film are composed of a composite package film as described above, the case 50 may be fabricated by a known method such as dry lamination, wet lamination, hot melt lamination or extrusion lamination.

For example, a film composed of a synthetic resin layer and a metal foil made of aluminum or the like are prepared for construction of the composite package film. The metal foil may be prepared by, for example, rolling a metal material.

Next, a composite package film (multilayer film) is fabricated, preferably by attaching the metal foil onto the film composed of the synthetic resin layer via an adhesive, to produce a multilayer structure as described above. The composite package film is cut to a prescribed size and a single rectangular film is prepared.

The single film is then folded in the manner explained above with reference to FIG. 3, and the seal section 51B (edge 51B) of the first film 51 and the seal section 52B (edge 52B) of the second film are, for example, heat sealed for only the desired seal width, using a sealing machine under prescribed heating conditions. Here, a partial section is left without heat sealing in order to provide an opening for introduction of the element 60 into the case 50. This procedure produces a case 50 with an opening.

The element 60 to which the anode lead 12 and cathode lead 22 are electrically connected is inserted into the case 50 provided with the opening. The nonaqueous electrode solution 30 is then injected therein. Next, the sealing machine is used to seal the opening of the case 50, with a portion of the anode lead 12 and the cathode lead 22 inserted in the case 50. This completes fabrication of the case 50 and electrochemical element 100. However, the electrochemical element of the invention is not limited to this shape, and may be of another shape, such as cylindrical.

When the electrochemical element is to be used for construction of an electrochemical capacitor, a metal (or metal alloy), a metal oxide or a carbon material (including carbon nanotubes) having electron conductivity may also be used as the electrode active material. In such cases, electrodes of the invention are preferably used for the anode and cathode.

(EXAMPLES)

The present invention will now be explained in greater detail through examples and comparative examples, with the understanding that these examples are in no way limitative on the invention.

Electrodes for Example 1 and Comparative Examples 1 and 2 each having a construction similar to the electrode shown in FIG. 1 were fabricated by the procedure described below.

(Example 1)

For fabrication of the electrode, first multi wall carbon nanotubes (MWCNT) (12 nm diameter, 100 μm length) (40 parts by weight) and a fluororubber binder (60 parts by weight) were mixed, and methyl isobutyl ketone (MIBK) was added as the solvent to obtain a slurry-like coating solution for formation of the electrode active material-containing layer. The obtained coating solution was coated onto an aluminum foil (20 μm) as the collector using a doctor blade, and was dried at 150° C. The drying was followed by rolling to obtain a carbon nanotube (CNT)-containing electrode (before polymer covering).

The electrode was placed in an electrolytic bath (electrolytic cell) containing an electrolyte solution, and electrolytic polymerization was carried out at 4.4 V (Li/Li+ standard) for 20 minutes while maintaining a constant potential, to obtain an electrode (polymer covered) for Example 1 having an electrode area of 1.77 $cm^2$. The electrolyte solution used was a monomer solution obtained by dissolving thiophene at 0.3 mol $dm^{-3}$ in a solution of 1.0 Mol $dm^{-3}$ $LiBF_4$ in propylene carbonate.

(Comparative Example 1)

A graphite fiber-containing electrode (before polymer covering) was obtained in the same manner as Example 1, except that graphite fibers (MCF) (product name of Petoka Ltd.) (90 parts by weight) and polyvinylidene fluoride (10 parts by weight) were used. The graphite fiber (MCF)-containing electrode was subjected to electrolytic polymerization in the same manner as Example 1 to obtain an electrode (polymer covered) for Comparative Example 1.

(Comparative Example 2)

An activated carbon fiber-containing electrode (before polymer covering) was obtained in the same manner as Example 1, except that activated carbon fibers (FR25) (Kuraray Chemicals Co., Ltd.) (90 parts by weight) and a fluororubber binder (10 parts by weight) were used. The activated carbon fiber (FR25)-containing electrode was subjected to electrolytic polymerization in the same manner as Example 1 to obtain an electrode (polymer covered) for Comparative Example 2.

(Electrode Characteristic Test 1)

Electrochemical cells were fabricated using the electrodes of Example 1 and Comparative Examples 1 and 2, and the CNT-containing electrode, MCF-containing electrode and FR25-containing electrode before fabrication (polymerization) of the electrodes of Example 1 and Comparative Examples 1 and 2 (that is, each electrode before and after polymer covering), and their charge-discharge characteristics were tested. The electrochemical cells were fabricated using each of the electrodes as the cathode, and metallic lithium as the anode. The electrolyte solution used was a solution of $LiBF_4$ at 1.0 mol $dm^{-3}$ in propylene carbonate.

Figure 10:
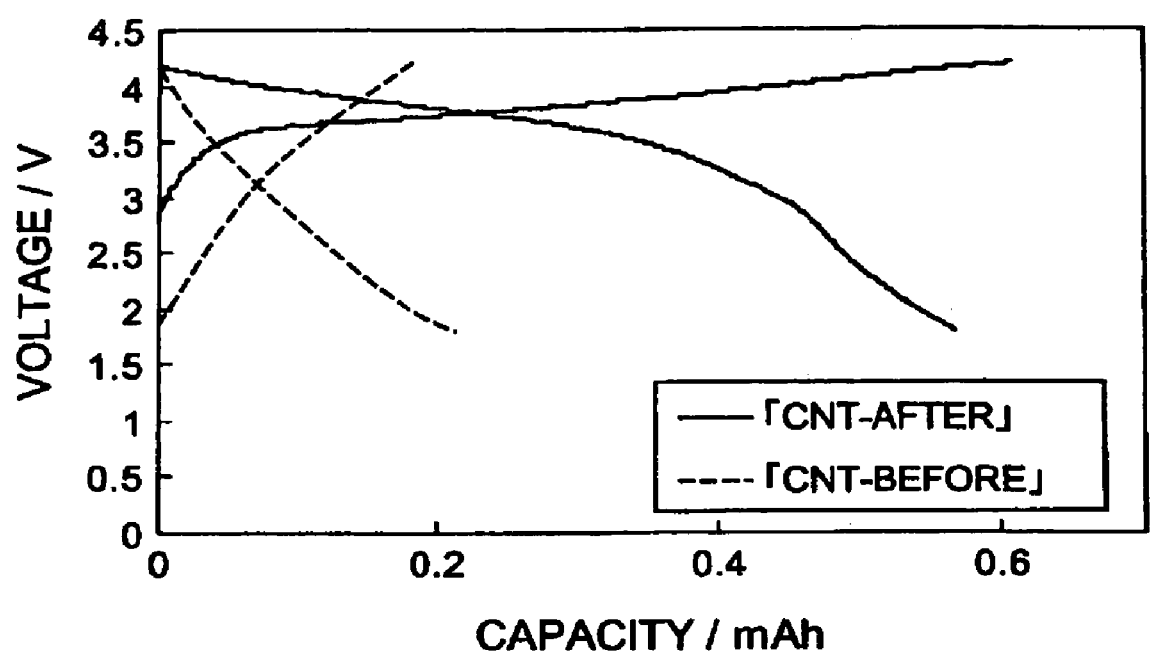
FIG. 10 is a graph showing charge-discharge curves for electrochemical cells employing the electrode of Example 1 and a CNT-containing electrode, respectively.
Figure 11:
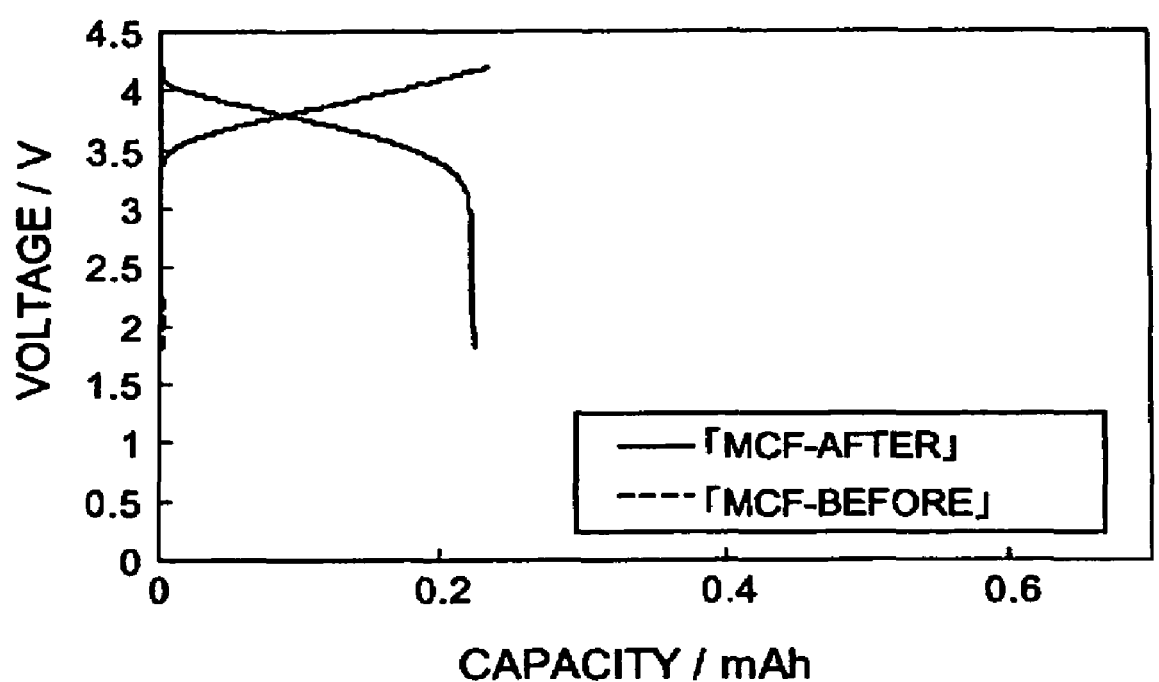
FIG. 11 is a graph showing charge-discharge curves for electrochemical cells employing the electrode of Comparative Example 1 and an MCF-containing electrode, respectively.
Figure 12:
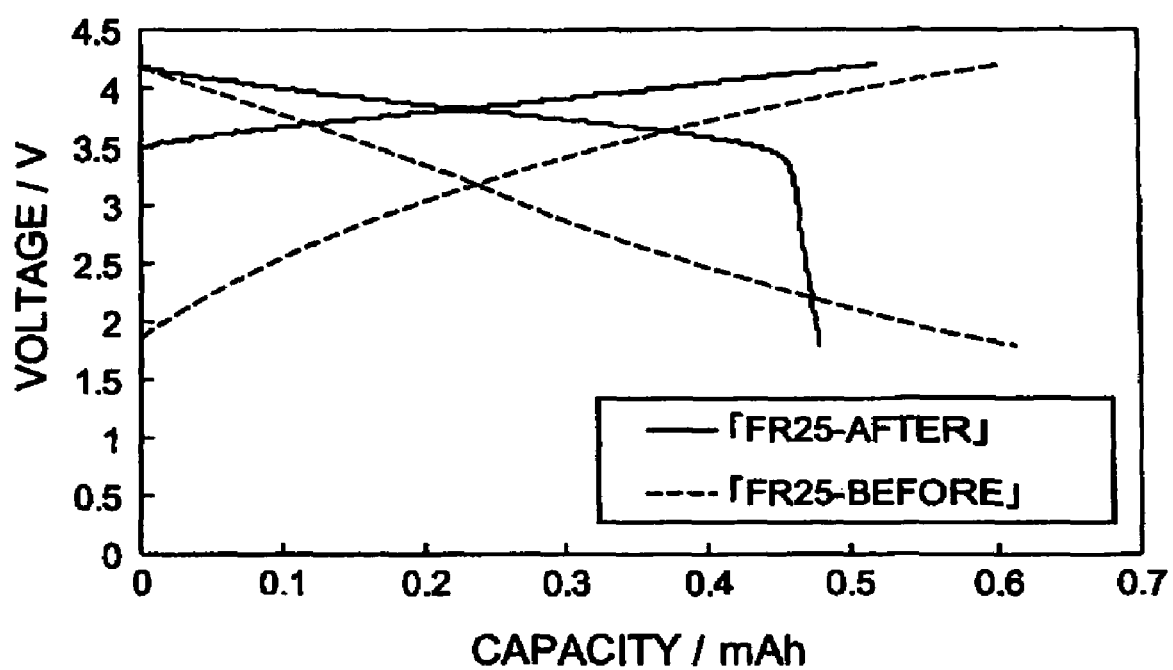
FIG. 12 is a graph showing charge-discharge curves for electrochemical cells employing the electrode of Comparative Example 2 and an FR25-containing electrode, respectively.

FIG. 10 shows charge-discharge curves obtained using the electrode of Example 1 and the CNT-containing electrode, FIG. 11 shows charge-discharge curves obtained using the electrode of Comparative Example 1 and the MCF-containing electrode, and FIG. 12 shows charge-discharge curves obtained using the electrode of Comparative Example 2 and the FR25-containing electrode.

As clearly seen by the results shown in FIG. 10, the electrochemical cell employing the electrode of Example 1 (CNT-AFTER) was confirmed to have vastly increased discharge capacity and also higher mean discharge voltage compared to the electrochemical cell employing the CNT-containing electrode (CNT-BEFORE), as a result of covering the CNT with polythiophene. In addition, the discharge energy was calculated to be over 3 times greater. Moreover, since capacity was exhibited even in the range with a voltage lower limit of below 3.0 V, even higher capacity should be achieved if the minimum voltage is lower than 1.8 V. Sufficient capacity was also exhibited to allow high-current discharge as well.

As clearly seen by the results shown in FIG. 11, the electrochemical cell employing the electrode of Comparative Example 1 (MCF-AFTER) was confirmed to have increased capacity compared to the electrochemical cell employing the MCF-containing electrode (MCF-BEFORE), as a result of covering with polythiophene, but the degree of increase was small. Also, the thiophene coverage was less than with the carbon nanotubes or activated carbon, and adequate capacity was not achieved. The electrochemical cell obtained using the MCF-containing electrode was confirmed to have very low electrical double layer capacity, with virtually no capacity being exhibited.

As clearly seen by the results shown in FIG. 12, the electrochemical cell employing the electrode of Comparative Example 2 (FR25-AFTER) was confirmed to have vastly reduced electrical double layer capacity compared to the electrochemical cell employing the FR25-containing electrode (FR25-BEFORE), as a result of covering the activated carbon fibers with polythiophene, and exhibited only the capacity of the polymerized polythiophene. Also, despite an increase in the mean discharge voltage, the improvement in discharge energy was minimal. The capacity was low in the region below 3.0 V, thus indicating that high capacity would not be achieved even if the minimum voltage is lower than 1.8 V.

The capacity (mAh), mean discharge voltage (V) and discharge energy (J) for each of the electrochemical cells explained above are shown in Table 1.

The measurement was conducted with a cutoff voltage of 4.2-1.8 V, and the discharge energy was determined by converting the capacity (mAh) to coulombs (1A·s=1C), and multiplying this value (C) by the mean discharge voltage (V) to obtain the discharge energy (1C·V=1J)

TABLE 1

| | | Capacity (mAh) | Mean discharge voltage (V) | Discharge energy (J) |
|---|---|---|---|---|
| Example 1 | CNT-BEFORE | 0.21 | 2.67 | 2.02 |
| | CNT-AFTER | 0.57 | 3.41 | 7.00 |
| Comp. Ex. 1 | MCF-BEFORE | 0.0018 | 2.92 | 0.02 |
| | MCF-AFTER | 0.22 | 3.69 | 2.92 |
| Comp. Ex. 2 | FR24-BEFORE | 0.62 | 2.91 | 6.50 |
| | FR24-AFTER | 0.48 | 3.77 | 6.51 |

As clearly seen by the results shown in Table 1, the discharge capacity, mean discharge voltage and discharge energy were improved by using the electrode of Example 1. In particular, the discharge energy improved by nearly 3-fold, thus indicating that high-current discharge was possible.

Electrodes for Examples 2 to 4 were also fabricated in the same manner as Example 1, and used for Electrode Characteristic test 2.

(Example 2)

A SWCNT-containing electrode (before covering) was obtained in the same manner as Example 1, except that single wall carbon nanotubes (SWCNT) (1.4 nm diameter, 100 µm length) were used instead of the MWCNT of Example 1. The SWCNT-containing electrode was used for electrolytic polymerization in the same manner as Example 1, to obtain an electrode for Example 2 (after covering). The electrode characteristic measurement for Example 2 was conducted with a cutoff voltage of 4.2-2.2 V.

(Example 3)

A MWCNT-containing electrode (before covering) was obtained in the same manner as Example 1, except that activated carbon fibers (FR25, product of Kuraray Chemicals Co., Ltd.) were included with the MWCNT during preparation of the coating solution for formation of the electrode active material-containing layer in Example 1. The MWCNT-containing electrode was used for electrolytic polymerization in the same manner as Example 1, to obtain an electrode for Example 3 (after covering). The MWCNT/FR25/fluororubber binder content ratio in the electrode was 13/52/35.

(Example 4)

An electrode for Example 4 (after covering) was obtained in the same manner as Example 1, except that pyrrole was used instead of the thiophene monomer for the electrolytic polymerization of Example 1.

(Electrode Characteristic Test 2)

The electrodes of Examples 2 to 4 (before and after polymer covering of the electrodes) were used to fabricate electrochemical cells in the same manner as for Electrode Characteristic Test 1, and the electrode characteristics thereof were tested. The capacity (mAh), mean discharge voltage (V) and discharge energy, (J) measured for each of the electrochemical cells are shown in Table 2.

TABLE 2

| | | Capacity (mAh) | Mean discharge voltage (V) | Discharge energy (J) |
|---|---|---|---|---|
| Example 2 | BEFORE | 0.52 | 2.91 | 5.45 |
| | AFTER | 0.55 | 3.15 | 6.24 |
| Example 3 | BEFORE | 0.40 | 2.92 | 4.20 |
| | AFTER | 0.58 | 3.47 | 7.25 |
| Example 4 | BEFORE | 0.23 | 2.60 | 2.15 |
| | AFTER | 0.69 | 3.30 | 8.20 |

According to the present invention, it is possible to provide an electrode which can be used to construct an electrochemical element with high energy density and excellent high-current discharge characteristics, and to provide an electrochemical element employing it.

What is claimed is:

1. A coated electrode comprising:
   an electrode comprising:
      a collector with electron conductivity, and
      an electrode active material-containing layer with electron conductivity formed on the collector, wherein the electrode active material-containing layer includes carbon nanotubes, and binder in an amount of 10-80 weight %, and
   a separate continuous film of a conductive polymer covering the entire electrode.

2. The coated electrode according to claim 1, wherein the conductive polymer has at least a molecular structure comprising a repeating unit based on a monomer represented by formula (1):

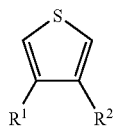

(1)

wherein R¹ and R² each independently represent at least one selected from the group consisting of hydrogen, alkyl, aryl and alkoxy, and R¹ and R² may also bond together at any of their carbon atoms to form a divalent group with a cyclic structure.

3. The coated electrode according to claim 2, wherein the monomer represented by formula (1) is at least one selected from the group consisting of 3-methylthiophene, 3-butylthiophene, 3-phenylthiophene, 3-methoxythiophene and ethylenedioxythiophene.

4. The coated electrode according to claim 1, wherein the conductive polymer has at least a molecular structure comprising a repeating unit based on a monomer represented by formula (2):

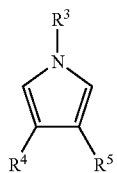

(2)

wherein R³ represents hydrogen or alkyl, and R⁴ and R⁵ each independently represent at least one selected from the group consisting of hydrogen, alkyl, aryl and alkoxy, and R⁴ and R⁵ may also bond together at any of their carbon atoms to form a divalent group with a cyclic structure.

5. The coated electrode according to claim 1, wherein the conductive polymer has at least a molecular structure comprising a repeating unit based on at least one selected from the group consisting of aniline, indole, pyridine and diaminoanthraquinone.

6. The coated electrode according to claim 1, wherein the electrode active material-containing layer further contains activated carbon.

7. The coated electrode according to claim 1, wherein the conductive polymer is formed by electrolytic polymerization.

8. The coated electrode according to claim 7, wherein the electrolytic polymerization is carried out using as a working electrode a carbon nanotube-containing electrode comprising a collector with electron conductivity, and an electrode active material-containing layer formed on the collector, the electrode active material-containing layer containing carbon nanotubes and exhibiting electron conductivity, and with the working electrode immersed in a solution containing the monomer of the conductive polymer.

9. The coated electrode according to claim 7, wherein the electrolytic polymerization is carried out using a solution containing a monomer as the structural material of the conductive polymer, and the carbon nanotubes.

10. An electrochemical element comprising:
mutually opposing first and second electrodes,
a separator situated between the first and second electrodes,
an electrolyte solution, and
a case housing the first electrode, the second electrode, the separator and the electrolyte solution in a sealed state,
wherein:
at least one of the first and second electrodes is a coated electrode comprising:
an electrode comprising a collector with electron conductivity and an electrode active material-containing layer with electron conductivity formed on the collector, wherein the electrode active material-containing layer includes carbon nanotubes, and binder in an amount of 10-80 weight %, and
a separate continuous film of a conductive polymer covers the entire electrode.

11. The electrochemical element according to claim 10, wherein the conductive polymer has at least a molecular structure comprising a repeating unit based on a monomer represented by formula (1):

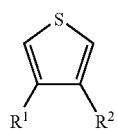

(1)

wherein R¹ and R² each independently represent at least one selected from the group consisting of hydrogen, alkyl, aryl and alkoxy, and R¹ and R² may also bond together at any of their carbon atoms to form a divalent group with a cyclic structure.

12. The electrochemical element according to claim 11, wherein the monomer represented by formula (1) is at least one selected from the group consisting of 3-methylthiophene, 3-butylthiophene, 3-phenylthiophene, 3-methoxythiophene and ethylenedioxythiophene.

13. The electrochemical element according to claim 10, wherein the conductive polymer has at least a molecular structure comprising a repeating unit based on a monomer represented by formula (2):

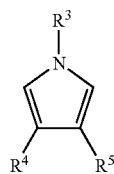

(2)

wherein R³ represents hydrogen or alkyl, and R⁴ and R⁵ each independently represent at least one selected from the group consisting of hydrogen, alkyl, aryl and alkoxy, and R⁴ and R⁵ may also bond together at any of their carbon atoms to form a divalent group with a cyclic structure.

14. The electrochemical element according to claim 10, wherein the conductive polymer has at least a molecular structure comprising a repeating unit based on at least one selected from the group consisting of aniline, indole, pyridine and diaminoanthraquinone.

15. The electrochemical element according to claim 10, wherein the electrode active material-containing layer further contains activated carbon.

16. The electrochemical element according to claim 10, wherein the conductive polymer is formed by electrolytic polymerization.

17. The electrochemical element according to claim 16, wherein the electrolytic polymerization is carried out using as a working electrode a carbon nanotube-containing electrode comprising a collector with electron conductivity, and an electrode active material-containing layer formed on the collector, the electrode active material-containing layer containing carbon nanotubes and exhibiting electron conductivity, and with the working electrode immersed in a solution containing the monomer of the conductive polymer.

18. The electrochemical element according to claim 16, wherein the electrolytic polymerization is carried out using a solution containing a monomer as the structural material of the conductive polymer, and the carbon nanotubes.

19. The electrochemical element according to claim 10, wherein the separator is formed of an insulating porous body, and at least a portion of the electrolyte solution is contained inside the first electrode, the second electrode and the separator.

20. The electrochemical element according to claim 10, wherein
- the first electrode, the second electrode and the separator each have sheet-like shapes,
- the case is formed using at least a pair of mutually opposing composite package films, and
- the composite package films comprise at least an innermost layer made of a synthetic resin in contact with the electrolyte solution, and a metal layer situated over the innermost layer.

* * * * *